Sept. 13, 1966 G. E. LOWITZ 3,273,123

CHARACTER RECOGNITION APPARATUS AND METHOD

Filed May 2, 1962 3 Sheets-Sheet 1

GABRIEL E. LOWITZ
INVENTOR.
BY Robert O. Richardson
ATTORNEY

GABRIEL E. LOWITZ
INVENTOR.

BY Robert O. Richardson

ATTORNEY

CHARACTER RECOGNITION APPARATUS AND METHOD

Filed May 2, 1962 3 Sheets-Sheet 3

GABRIEL E. LOWITZ
INVENTOR.

BY Robert O. Richardson
ATTORNEY

United States Patent Office 3,273,123
Patented Sept. 13, 1966

3,273,123
CHARACTER RECOGNITION APPARATUS AND METHOD

Gabriel E. Lowitz, Canoga Park, Calif., assignor to Thompson Ramo Wooldridge Inc., Canoga Park, Calif., a corporation of Ohio Filed May 2, 1962, Ser. No. 191,867
5 Claims. (Cl. 340—146.3)

This invention relates generally to methods and apparatus for recognizing characters and more particularly to the utilization of scanning techniques for developing character analysis information suitable for character identification purposes.

There is an ever increasing mass of information being recorded in the form of books, magazines, reports, and papers and it is becoming increasingly difficult to quickly locate pertinent data therefrom on any desired subject. Even in highly organized libraries where the information is classified and reclassified in great detail, there is still a need for quickly locating and retrieving the information desired. Within a given class of subject matter there is further need of abstracting various printed articles to determine which are most pertinent to the interests of a reader. The need is therefore apparent for some type of automatic abstracting system which will quickly identify the subject matter of articles for the reader.

One such abstracting system involves the use of key words, and if a given article contains a certain number of these key words which are of interest to the reader, then it is evident that this article is one that the reader should have. Any such abstracting system, whether it involves the use of key words or whether some other technique is used, would require the identification of letters or characters which make up the key words or which are used in another abstracting technique. Thus, letters or characters must be identified.

Heretofore, characters have been analyzed to obtain data thereon which may be compared with known stored information to thereby identify the characters. One such system compares a group of templates with the character to thereby identify the character. In another method an image field around the character is divided into sub-areas and the recognition of those sub-areas containing a portion of the character is used to identify the character in this field. Another system analyzes the number of vertical lines, horizontal lines and curved lines in a character to thereby identify the character. These and other methods are more fully discussed in a state-of-the art report on automatic character recognition in National Bureau of Standards NBS Report 7175.

In practicing each of the above methods, the character must be critically positioned relative to the equipment used to analyze the character. The failure to position the character properly relative to the apparatus used in analyzing the character will result in developing non-identical identification information when the characters at different positions are analyzed. One remedy for this is the use of multiple sets of identifying information to identify like characters which may be positioned differently relative to the apparatus used in their analysis. However, an inordinate amount of logic is required to accommodate various possible combinations of data that are capable of identifying the character. Not only does this add to the size and complexity of any apparatus used, but this also requires exhaustive advance exploration of the different possibilities of character pattern variation. In addition, a mass of additional stored information is required for identifying various styles in which the character may appear.

In accordance with the present invention, the above complications due to variation in location of a character relative to apparatus used in its analysis are substantially avoided by scanning over the character along predetermined paths. As will be seen hereinafter in a preferred embodiment, these paths will be in the form of straight strokes passing through the character. However, the paths may conform to other predetermined patterns. In the scanning along a line over a character, opacity or contrast variations defined by the character against its background will be observed where the scan line intersects a portion of a character. The information developed from a plurality of such scan lines over a character thus may be used to identify the character.

More specifically the identification of a character by analyzing the scanning strokes over the character, such as by noting the number of intercepts a scanning stroke makes with the character, the length of each intercept as well as the distances between intercept is called character stroke analysis.

In the use of a character stroke analysis technique, with a greater number of strokes over a character more information about the character can be obtained. The stroke lines may be so dense that their relative positions on the character are not critical since he whole character will be thoroughly scanned anyway. However, character scanning with a high density raster increases the scanning time required and develops redundant information not necessary to the identification of the character. Moreover, with the gathering of more identifying information than is absolutely necessary to positively identify the character, the probability increases that mismatches or rejects will occur if the characters scanned are not of the same identical shape as those known characters having their identification information available for comparison. As more identifying information is available less tolerance is permitted for character variations.

In accordance with the present invention, advantage is taken of the fact that for certain fonts or styles of characters there is a minimum number of scanning strokes of predetermined configuration which, if properly positioned over the characters, may be used to develop sufficient information to adequately identify the characters. With a minimum total length of scanning lines over the character, or minimum number of equal length strokes, the shape of the character may vary somewhat and still provide the same identifying information. While it is to be understood that different fonts require a different total length of scanning lines, it has been found that in the Financial Gothic Alphabet, for example, a stroke spacing sufficient for five vertical strokes to scan the widest letter, an M or a W, is best. With this spacing and in the use of vertical strokes, a letter of less width, such as an *i* or *l*, would be scanned in one or two strokes. In this form of character recognition, the scanning strokes must intercept identical characters at identical places on the characters in order to develop identical information with which to identify each character. This position of the scanning stroke over the character, then, becomes quite important and, in addition to the character stroke analyses technique involved, it is this problem to which a portion of the present invention is directed.

Briefly, in accordance with one embodiment of the present invention, after the proper stroke spacing has been determined for the particular font of the characters to be scanned, the first vertical stroke of the character scanning series is critically positioned with respect to the leading edge of the character. In this manner the strokes will intersect identical portions of identical characters to produce identical identifying information and the subsequent matching of information with that of known characters is greatly simplified.

In one embodiment of the present invention, the leading edge of a character is used to properly position the scanning strokes over the character. A scanning apparatus is used to scan a line of text with scanning strokes closely spaced in a high density raster mode until the leading edge of a character is located. When one of the strokes intercepts the leading edge of the character, an opacity or contrast variation in the stroke path is observed. At this point the mode of scanning is changed to form a low density raster over the character which is made up of uniformly but more widely spaced apart strokes. After a predetermined number of low density mode scanning strokes or after the scanning over the character has been completed, whichever occurs first, the scanning raster is returned to the high density raster mode scan again. In this manner like characters are intercepted at like points on the characters by the scanning strokes made by the scanning apparatus, and at the same time redundancy is reduced in the information developed by scanning over the character with a minimum number of strokes.

The character identification information in one form of the invention is obtained by dividing the scanning strokes into time or length segments and observing the time of intersections or duration of the intersections with parts of a character and comparing this data with information representing known characters to identify the character being scanned. In this manner the identification information obtained is substantially invariant with respect to the lateral position of the character relative to the position at which the scanning of each line of text is started. In the preferred form of the invention where a character is scanned with strokes generally perpendicular to the direction along which the line of text extends, the information developed is also invariant to the position of the character to and from a direction substantially parallel to the strokes.

The invention is described in greater detail in the accompanying drawings wherein like numerals refer to similar parts and wherein.

Figure 7:
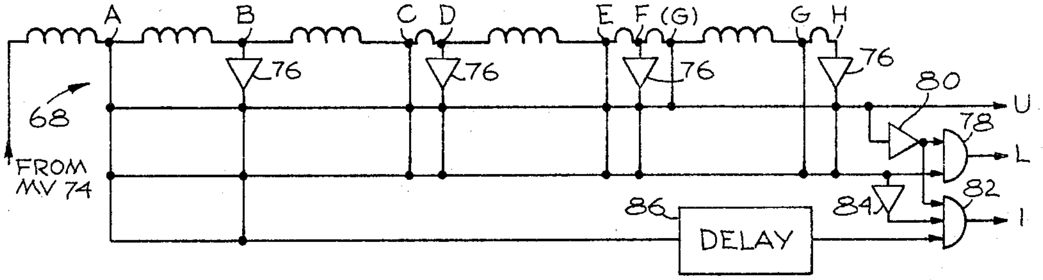
Figure 6:
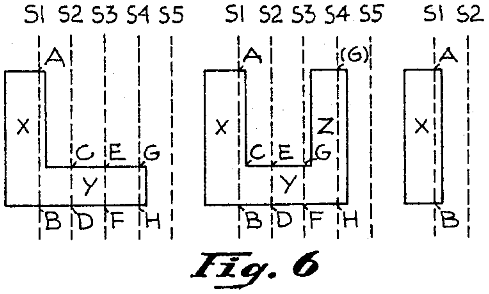
Figure 2:
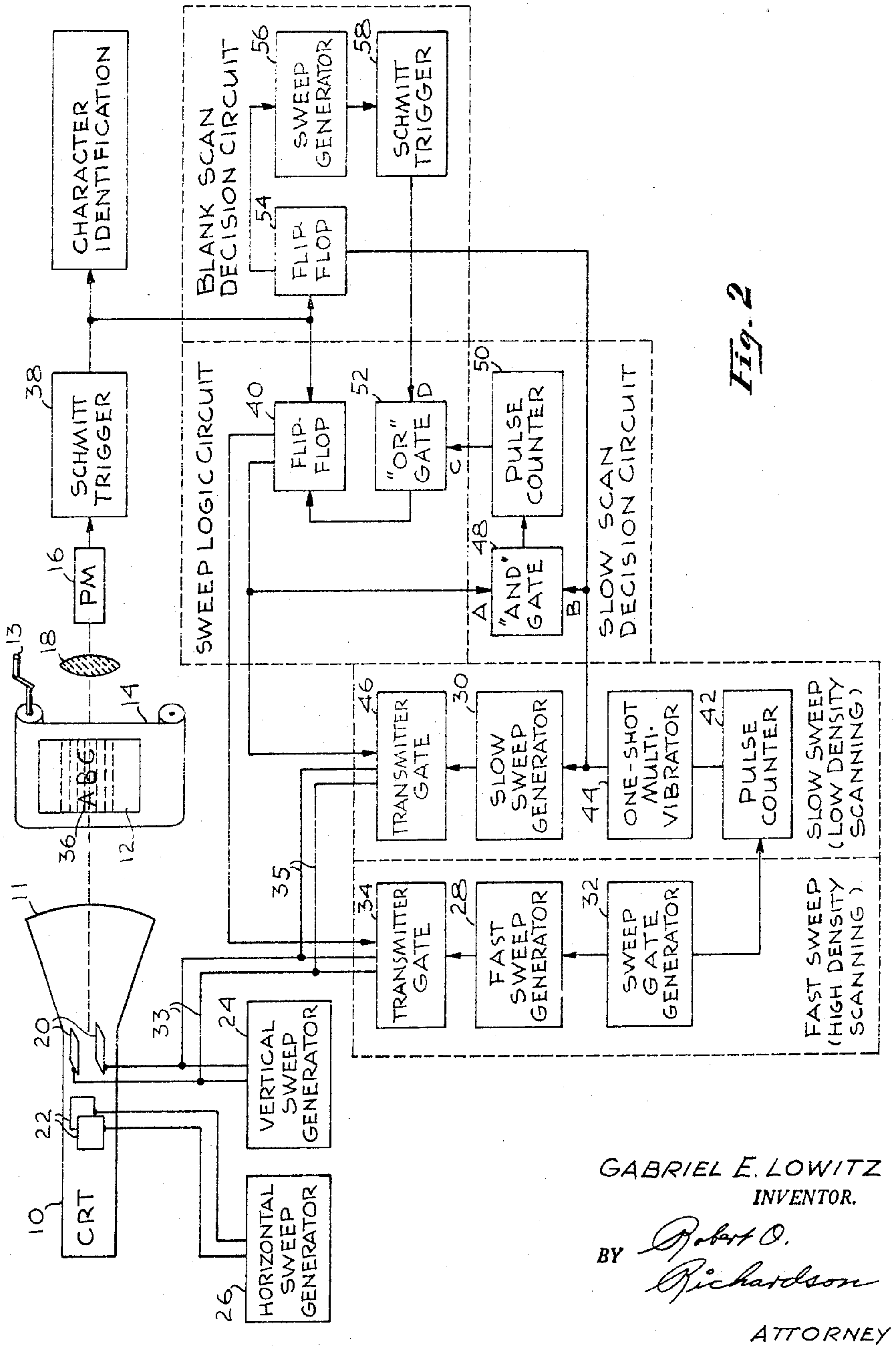
FIG. 2 is a block diagram showing of one form of dual density raster scanning system embodying the present invention.
Figure 3:
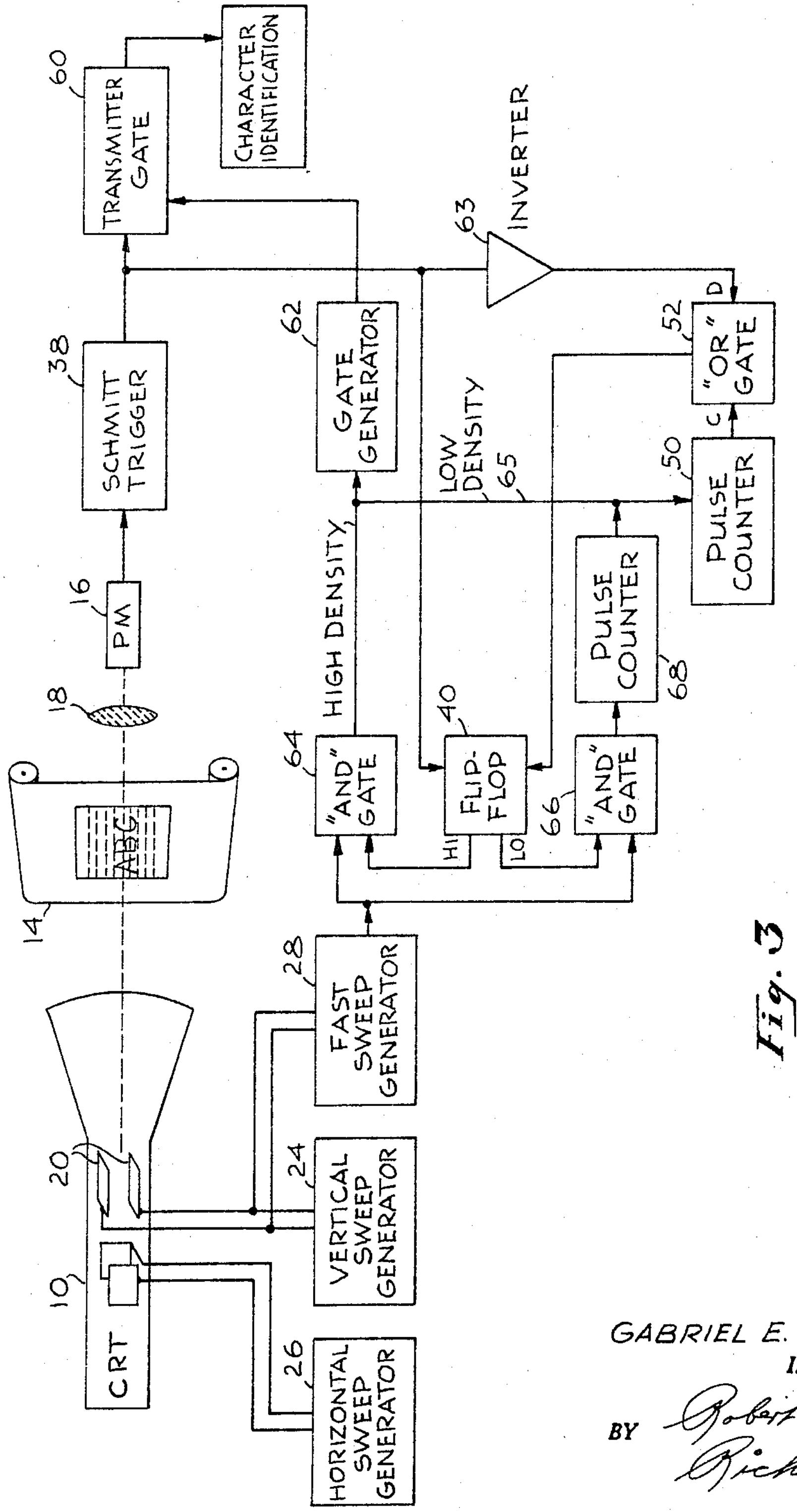
FIG. 3 is a block diagram illustrating another form of a dual density raster scanning system in accordance with the present invention.

FIG. 6 is an illustration showing selected characters that, although having similar characteristics, are capable of individual recognition through the practice of the present invention; and FIG. 7 is a combination block and schematic representation illustrating a logical circuit useful in connection with the embodiments of the present invention shown in FIG. 2 and FIG. 3 for dissimilating between similar characters of the type shown in FIG. 6.

Before considering the nature and detailed operation of apparatus useful in the practice of the present invention, it will be found helpful to first give attention to the unique methods of character identification and text scanning which typify the present invention.

Figure 1:
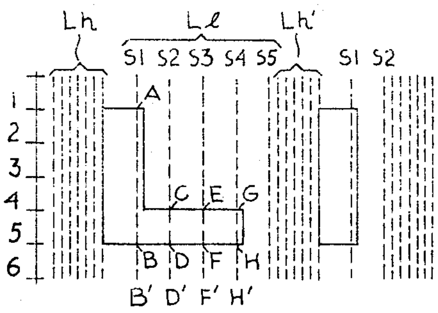
FIGURE 1 shows characters corresponding to the alphabetic letters L and I within a low density scanning stroke raster with a high density scanning stroke raster before and after the letters.

Referring therefore to FIGURE 1, there is shown, by way of example, the letters L and I, representing or forming a part of a line of text which is to be scanned from left to right in accordance with the present invention. The scanning strokes, also by way of example, will be taken as falling along straight lines which are arbitrarily made six units long, sufficiently long to have a part of each stroke above and below the letter which is to be scanned. As will be seen hereinafter, by assigning length units to the strokes, the principles underlying one aspect of the present invention will be more quickly grasped. The closely spaced dashed lines shown generally at L*h* at the left of the letter L represent the positions of the strokes comprising the high density raster scanning mode which is carried out before the leading edge of the letter is intercepted. The dashed lines shown generally at L*l* across the letter represent the positions of strokes comprising the low density raster scanning mode. These in turn define or form a frame of reference about the letter, when the leading edge of the letter is intercepted by a high density scanning stroke. The closely spaced dashed lines shown generally at L*h'* at the right of the letter represent the positions of strokes comprising the high density raster which is formed after the letter has been scanned, or five low density strokes have been made, whichever occurs first. Again, when one of the high density strokes contacts the leading edge of the letter I, a low density raster or frame of reference is formed as just described in connection with the letter L. This raster, however, ends with the second stroke since the second stroke sees no part of the character. As will be seen more clearly hereinafter, this again institutes scanning in the high density raster mode.

For the sake of simplicity, a stroke may be considered as being generated by moving a scanning spot (not shown) vertically from top to bottom of both rasters which acts over the line of text to be scanned. The strokes are formed, one line at a time, from left to right. The spot in scanning in its low density raster mode first strikes the letter L at point A and leaves it at point B on the first stroke. The second stroke crosses the foot of the letter L at points C and D, on the third stroke E and F, the fourth stroke G and H, and the fifth stroke misses the letter. That portion of the stroke which intersects a part of the character may be measured in terms of length or time for the scanning spot to pass through or over the character. Thus, the distance or time between A and B might be four units and the distances or times between C and D, E and F, and G and H might be one unit. Upon the passage of one complete stroke without passing through the character, indicated by the absence of intersection units during that interval of space or time, the scanning of that particular character is completed and the information developed may be compared with information concerning known characters for the character identification. The scanning at high density continues until the leading edge of the next letter I is contacted, at which time the low density scanning raster is formed. Again, when five strokes are made in the low density mode, or until the letter has been scanned, whichever occurs first, the scanning is switched back to the high density mode again. This process continues until all letters in a line of text have been scanned, after which suitable apparatus, not shown, will arrange for the scanning of the next lower line of text.

One preferred apparatus for scanning a line of text and generating information from which letters on the line of text may be identified is shown in FIG. 2. Here the scanning spot which makes the scanning strokes over each letter is produced by the impingement of the electron beam generated within the cathode ray tube 10 upon a target 11. The page of text 12 is by way of example indicated as being on a frame of microfilm 14 suitably positioned by apparatus, not shown, in front of a photomultiplier 16 which generates video signals in accordance with the light beam intersections with the characters. Although not shown, to this end, the microfilm should be considered as abutting the target 11 of the tube. Lens 18 represents a suitable optical system for focusing the light passing through the microfilm 14 onto the photomultiplier 16.

The cathode ray tube 10 is of the conventional type supplied with pairs of vertical and horizontal electrostatic deflection plates 20 and 22. Sawtooth voltage waveforms are supplied to the pairs of vertical and horizontal deflection plates from conventional vertical and horizontal sweep generators 24 and 26 in preselected time and amplitude relation to produce a plurality of horizontal scanning lines resembling the scanning routine used in commercial television. The spot of light produced by the electron beam in the cathode ray tube 10 will be swept over a page of text 12 in a series of horizontal lines progressing from the top to the bottom of the page.

The above mentioned horizontal lines are modified in accordance with the present invention so that they include a vertical "jitter" component which converts each horizontal line into a raster of closely spaced substantially vertical strokes each of sufficient length to pass over any one of the characters on a line of text, as illustrated in FIG. 1. These strokes, in the high density mode of operation, are sufficiently close that the leading edge of a character will not appear between the strokes. A stroke density of approximately 700 strokes per line of text has been found adequate for this purpose. At the completion of one line, the scanning beam is then deflected down and to the left a sufficient amount to position the horizontally extending raster over the next lower line. After all of the lines on the page have been completely scanned, the microfilm is advanced, such as by crank 13, to a position displaying the next page of text to be read.

With the light spot moving horizontally from left to right across the page of text 12 at a uniform rate, the frequency of vertical "jitter" determines the density of the raster. A low jitter frequency will create a horizontally extending raster of fewer vertical strokes for a given horizontal length than will a higher jitter frequency. In this manner a low jitter frequency produces a low density raster and a higher jitter frequency produces a high density raster. As shown, sweep generators 28 and 30 are provided for this purpose. Fast sweep generator 28 produces the high frequency jitter and high density raster while slow sweep generator 30 produces the low frequency jitter and low density raster. As will be seen hereinafter, in accordance with the present invention, the high density raster will be used between characters and the low density raster will be used over the characters. For ease in later reference, while the high density raster is in use the scanning operation will be regarded as being in a searching mode and when a low density raster is in use the scanning operation will be referred to as being in a reading mode. The mode used during any portion of the horizontally extending raster will be determined by information taken from the video signals developed as the light spot passes over a character or the lack of video signals when the light spot is not passing over a character. Hence each line of text will be scanned by a raster, portions of which are made up of scanning lines depicting a high density mode and portions of which are made up of scanning lines depicting a low density mode. In this sense, the scanning action of the present invention may be regarded as being dual density in character.

*Dual density scanning*

With the dual density scanning arrangement shown in FIG. 2, either a fast sweep generator 28 or slow sweep generator 30 is connected to the vertical deflection plates 20 of a cathode ray tube 10, depending upon whether the sweep is over a character and a reading mode of operation is desired or between characters when a searching mode is desired. Sweep gate generator 32 may be a free running multivibrator of a type well known in the art for establishing the timing of the fast vertical scan. This generator controls the operation of the fast sweep generator 28 which may be a bootstrap sweep generator. The sawtooth signal from generator 28 passes through transmission gate 34 to the vertical deflection plates 20 via circuit paths 33 when gate 34 is open. Gate 34 is a linear transfer device wherein the amplitude of its output is proportional to the input during the gated period and which has no output outside the gated period or when the gate 34 is closed. The line of text 36 to be read is then scanned by the flying spot from the cathode ray tube 10 making vertical strokes in a left to right movement. The light passing through the film is sensed by the photomultiplier 16 to produce a video output signal which is applied to a Schmitt trigger 38. The output signal from the Schmitt trigger 38 is in turn applied to the character recognition apparatus to be hereinafter described. The fast sweep scan or high density searching mode is used until such time as the flying spot intersects a character, at which time a video output signal is sent from the Schmitt trigger 38 to the Sweep Logic Circuit where flip-flop 40 then switches the apparatus to the slow sweep scan or reading mode of operation. The Slow Sweep Scanning apparatus consists of pulse counter 42 which counts the pulse generated in the sweep gate generator 32 and, in response to a predetermined number of pulses, preferably five, triggers the one-shot multivibrator 44. In this manner a pre-established ratio is established between the fast sweep and the slow sweep, or the relative densities of the high density and low density rasters. The one-shot multivibrator then establishes the sweep gate for slow sweep generator 30. Generator 30 generates output signals of sawtooth waveform which are applied to the vertical deflection plates 20 of the cathode ray tube 10 via circuit paths 35 when its transmission gate 46 is opened by the flop-flop 40. Thus, when a video signal is received in the output from Schmitt trigger 38, the scanning rate is switched from the fast sweep to the slow sweep rate and the horizontally extending raster is switched from high density to low density.

The slow sweep should be terminated when either of two conditions are present, one, when a specified number of slow sweeps have been accomplished, and the other when no video signal is present, indicating that the letter has already been scanned. In the first instance, assume that five slow sweep scans are desired to scan the widest letter, such as a W or an M. Flip-flop 40 has switched to the slow sweep scan and the A connection to the "AND" gate 48 is receiving pulses. Also, the one-shot multivibrator 44 is feeding pulses to the B connection of gate 48. The logic of the "AND" gate 48 is such that when both pulses are present a pulse is sent to the five-pulse counter 50. When the five-pulse counter has counted five pulses, an output is sent to the C connection of the "OR" gate 52 which in turn passes a pulse to flip-flop 40 triggering it back to its fast sweep state. In this manner, after five scans of slow sweep, the apparatus automatically switches back to a fast sweep scan.

The other half of the slow sweep terminating apparatus operates when the video signal ceases at a time before the five slow scans have been accomplished. This would occur in the scanning of a narrow letter such as I or a lower case *l*, for example. For this function flip-flop 54 is also connected to the output of the one-shot multivibrator 44 in such manner that in one state the flip-flop provides an output with each multivibrator pulse. In the absence of a video signal, such as when the letter scanning has been completed, the one-shot multivibrator 44 gates the sweep generator 56 which generates sawtooth voltages of sufficient amplitude to provide an output from the Schmitt trigger 58 for each pulse. This signal passes into the D input of the "OR" gate 52 and keeps the flip-flop 40 in the fast sweep condition. However, the presence of a video signal changes the state of the flip-flop 54 so as to terminate the voltage output from sweep generator 56, and with no output from the Schmitt trigger 58 the D input will not cause "OR" gate 52 to change the state of the flip-flop 40 to a fast sweep. Instead, the opposite effect is reached since the video signal from the Schmitt trigger 38 keeps the flip-flop 40 in its slow sweep scan state. In this manner, when the video signal ceases, which means that the character has been scanned with less than five slow strokes, the slow sweep scan mode is terminated and the fast sweep scan mode is again applied until such time as the next character is intercepted by the flying spot.

*Selected stroke scanning*

The selected stroke scanning method is another way of effectively reducing the density of scanning strokes over the letter being scanned. This method uses the same scanning stroke rate over the characters as between them but in the information from selected strokes over the letter are eliminated before the stroke information is passed onto the character identification circuit. The masking out of information from alternate strokes has been found to be satisfactory, although the masking out of a different number of strokes may be preferred, depending upon the original scanning density and the scanning density desired. Referring now to FIG. 3, where like numbers refer to like parts in FIG. 2, a conventional cathode ray tube 10 is used with a horizontal sweep generator 26 and a vertical sweep generator 24 positioning the light beam for scanning along selected lines of text. The fast sweep generator 28 supplies the sawtooth waveform to the vertical deflection plates 20 to provide the vertical stroke raster over the characters of the selected line in the same manner as described in connection with FIG. 2. Sweep generator 28 operates in the fast sweep mode in the same manner that it operated in FIG. 2. Here again microfilm 14 and lens 18 are positioned between tube 10 and photomultiplier 16. Photomultiplier 16 generates video signals which are passed to Schmitt trigger 38 in response to the intersection of the light spot with characters on the microfilm.

Schmitt trigger 38 must pass signals through transmission gate 60 before they can be applied to the character identification circuits. Gate 60 is controlled by gate generator 62 which receives pulses from sweep generator 28 by a high density path 63 or a low density path 65. Flip-flop 40 selects the path in accordance with the video pulse information from Schmitt trigger 38. A lack of a video pulse from the trigger 38 will generate a pulse from inverter 63. This pulse passes through "OR" gate 52 and sets flip-flop 40 to activate "AND" gate 64 in the high density path. The pulses from fast sweep generator 28 use this path to gate generator 62 and gate 60 is opened to pass video information available from any scanning stroke.

A video pulse from trigger 38 via inverter 63 removes the pulse from input D to the "OR" gate 52 and also sets flip-flop 40 to activate "AND" gate 66 in the low density path. Pulse counter 68 passes a pulse for each preselected number of pulses received. Pulses from couter 68 pass to gate generator 62, and gate 60 passes information from the scanning strokes thus selected. By setting the pulse counter 68 to the number of strokes desired, it is possible to obtain information from any number of selected strokes over a character to thus vary the tolerance of the scanning apparatus to character shape variations.

Provision is made to return to the high density scanning mode after five low density strokes have been made by simply adding a five count pulse counter 50 between pulse counter 68 and input C of "OR" gate 52. Thus, when five pulses from counter 68 occur, opening gate 60 at these selected intervals, counter 50 then passes a pulse through "OR" gate 52 to flip-flop 40. This pulse to flip-flop 40 returns to its state of activation of "AND" gate 64, causing gate 60 to be open during every scanning stroke.

The character identification circuit referred to in connection with the apparatus in FIGS. 2 and 3 may be of any type capable of receiving and converting a series of pulses of varied spacing and duration (which represent the intersections of scanning strokes with characters) into the identification of the character from which this information was derived. In one preferred embodiment shown in FIG. 4, a delay line 68 is used. This delay line has an electrical length or delay equal to the scanning time required for the five low density strokes to pass over the widest letter and, in the example shown, the delay line has taps 70 at time intervals corresponding to the waveforms in FIG. 5 which represent the information taken in scanning the letter L. It should be understood that the delay line has additional taps, not shown, from which combinations of connections can be made to identify all characters of a desired font.

Figure 5:
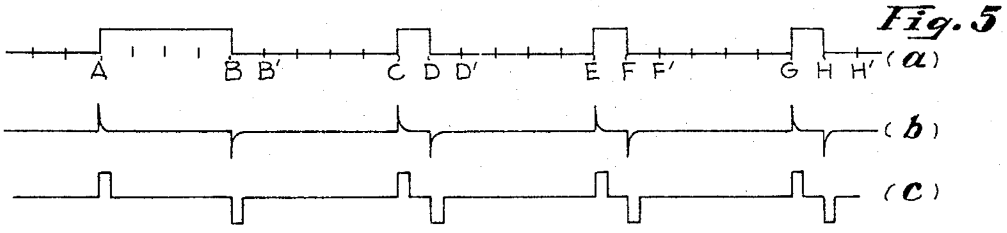
FIG. 5 is a graphical representation of certain voltage waveforms developed in the practice of the present invention in accordance with the embodiments thereof illustrated in FIG. 2 and FIG. 3.

The pulses leave the apparatus described and shown in FIGS. 2 and 3 in the manner shown in waveform *a* of FIG. 5. This waveform represents the letter L scanned in FIG. 1 having stroke intersections AB, DC, EF and GH. As shown in waveform *a* of FIG. 5, the first intersection AB is four units wide. The interval from B through B′, the bottom of the raster, to C on the next stroke is shown as five units of no signal. The intersection CD is one unit wide and the no signal interval D to E on the next stroke is five units wide. Intersection EF is one unit wide and no signal interval FG is five units wide. Intersection GH is one unit and thereafter a no signal interval (not shown) of at least seven units will appear, indicating no signal has appeared for a period longer than a stroke, signifying the completion of the letter.

It is readily apparent that if the raster over the characters is moved vertically up or down or is not accurately positioned over the character, the same amount of no signal will still appear between the periods of character signal. Moving the raster up or down over the character simply shifts the B′, D′, F′ positions along the no signal interval and there is no change in the signal pattern developed.

Figure 4:
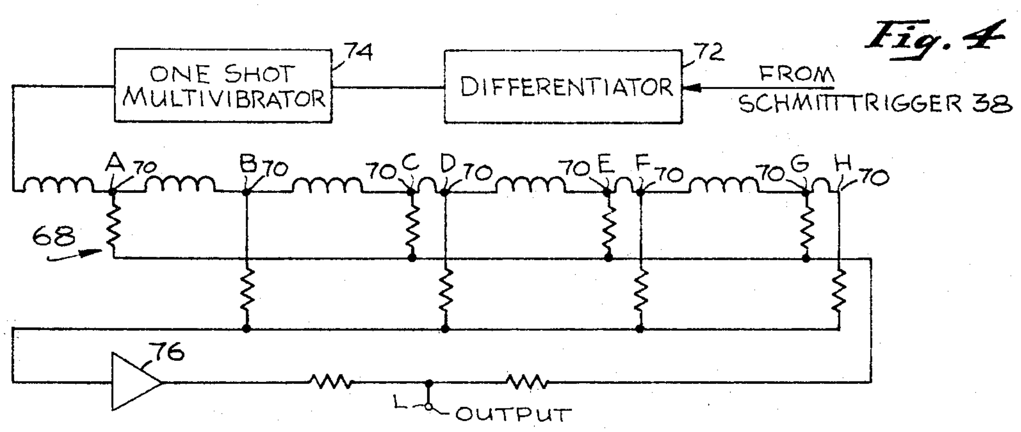
FIG. 4 is a combination block and schematic representation showing one type of character identification circuit useful in the practice of the present invention in accordance with the embodiments illustrated in FIG. 2 and FIG. 3.

These pulses in waveform *a* are then differentiated by the differentiator 72 in FIG. 4 to develop the positive and negative spikes or sharp pulses shown in line *b* in FIG. 5 to indicate the change of state from a signal output to a no signal output and vice versa. To provide a better signal with which to work, instead of using the differentiated output signals, these signals are used to trigger the one-shot multivibrator 74 in FIG. 4. This multivibrator generates short constant width pulses of equal amplitude, as shown on line *c* in FIG. 5 These pulses and their spaced intervals can now be identified by the delay line 68 as the letter L that was scanned.

When the delay line is energized with the pulse pattern shown on line *c*, each of the pulses will appear at the group of taps with which the letter L has a suitable circuit network attached, and a maximum voltage reading will appear at the letter readout point L.

The circuit network for the letter L consists of leads interconnecting the various taps 70 to the letter readout point L. Those taps receiving negative pulses are tied to an inverter 76 which converts the negative pulses to positive pulses so they will have an additive effect with the positive pulses at readout point L. The accumulated voltages will provide a maximum voltage at point L because the waveform developed "fits" the letter L.

In a similar manner, appropriate taps, not shown, on the delay line should correspond with the spacing of signals from other characters so that their output voltages will be maximum when their waveforms appear at the delay line.

Character translation from one language to another may be done simply by re-identifying the readout point as that of the corresponding character in the new language in which the identification is desired.

It should be noted that by increasing the pulse width of pulses from multivibrator 74 and by increasing the number of adjacent windings connected to the taps, the identification of characters within a wider range of variations may be accomplished. Similarly, the identification of characters may be made more critical of the character variations by narrowing the pulses and connecting each tap to fewer windings on the delay line.

It should also be noted that in this type of character identification, bursts of noise mixed with the pulses are filtered out since only voltages at the taps come through the character identifying networks and are indicated at the character readout points. Pulses not of the correct timing sequence for a particular character will not be seen in the output designating that character. It should also be noted that some variation in character size is also permitted since the resulting pulses still energize the same taps but with pulses of greater width.

Further discriminating modification is necessary to distinguish between letters having similar first portions, such as an L, U and I for example. These letters are shown in FIG. 6 with scanning stroke lines thereover. When a series of pulses representing a U is fed to the delay line of FIG. 4, those pulses representing the first portion of the letter U, marked X in FIG. 6, will be identical with those representing the letter I and also the first portion of letter L. At this point in time, the letter I will be falsely identified by the character identification circuits. The next pulses identifying the base portion Y of the letter U will also complete the identification of letter L, giving a false identification of L. At this point in time the letters I and L have been falsely identified, even before the true letter U has been completely scanned. In such cases of identical overlap of pulse information, suitable logic gates must be added to the letter identification networks such as shown by way of example in FIG. 7. Here the delay line 68 is tapped in a manner similar to that of FIG. 4 with the additional tap (G) shown. This tap is necessary in the identification of the letter U. Inverters 76 extend from those taps in the delay line where negative pulses will appear in the waveforms that will identify the letters in question. Each letter has its own network connected to the appropriate taps which will identify the particular letter when the correct waveform appears. The letter U does not have logic gates in its output since none are needed. The letter L is made to read out only in the absence of further pulse information that will identify the letter U. This is done by the use of an "AND" gate 78 having an inverter 80 interconnected between one of the gate inputs and the output of letter U. Since the inverter 80 presents a pulse in the absence of a pulse input, "AND" gate 78 will permit a signal on the L output only when the L identifying information is present in the absence of further information that identifies the letter U. In this manner the first portion of the information identifying the letter U will not cause a pulse readout identifying the letter L. In a similar manner an "AND" gate 82 is placed in the output path of the identifying letter I. Inverter 84 interconnects the L information path with one of the inputs of gate 82. Inverter 80 also interconnects the U information path with another input of gate 82. Since the information identifying the letter I is obtainable from the first portion of the delay line, an additional delay 86 must be added so that all information reaches gate 82 at the same time. The logic of gate 82 now says that information identifying the letter I, in the absence of further information identifying the letters L or U, will be passed to the I identifying output. From the foregoing example, it thus becomes apparent that discrimination may be made between overlapping earlier information by the utilization of subsequent information that is not overlapping.

In the foregoing specification and in the appended claims, the term "scanning in a low density mode" is used to indicate that the information passed to the character identification circuits is from scanned lines spaced further apart than the scanning lines between characters, although in one embodiment the scan lines are actually spaced further apart and in the other embodiment the scanning lines are of the same density although certain of the lines are masked out to give a readout for the selected scanned lines. Signals passed to the character identification circuits are the same in the practice of either method.

The following table is given to facilitate conversion of various components shown in the drawings in block diagram form into schematic diagram form. The left-hand column lists the components and their identifying numbers. These components are shown and described in the corresponding figures and pages of the text listed.

| Element | Text | Page | Figure |
|---|---|---|---|
| Sweep gate generator 32 | "Pulse and Digital Circuits" by Millman and Taub. Published 1956 by McGraw Hill Book Company. | 199 | 6–16 |
| Sweep generator 24, 26, 28, 30, 56, 62. | do | 210 | 7–10 |
| Transmission gate 34, 46, 60. | do | 437 | 14–12 |
| Multivibrator 44, 74 | do | 187 | 6–10 |
| Pulse counter 42, 50, 68 | do | 346 | 11–23 |
| Flip-flop 40, 54 | do | 147 | 5–5 |
| Schmitt trigger 38, 58 | do | 165 | 5–17 |
| "OR" gate 52 | do | 394 | 13–3 |
| "AND" gate 48, 64, 66 | do | 398 | 13–8 |
| Inverter 63, 76, 80, 84 | do | 401 | 13–12 |

While the foregoing embodiments have herein been described, they are intended to be illustrative of the invention and are not intended to limit the scope thereof since many other variations and modifications will readily appear to one skilled in the art. It is therefore intended that various changes and modifications may be made without departing from the spirit of the invention or the scope of the appended claims.

What I claim is:

1. Apparatus for recognizing a character in a line of text extending in a first direction including;

a scanning means;

first means for moving said scanning means relative to said line of text in said first direction at a constant rate;

second actuatable means for moving said scanning means through a finite distance in a second direction extending perpendicular to said first direction;

first actuating means operable to actuate said second actuatable means at a high rate;

second actuating means operable to actuate said second actuatable means at a low rate;

means responsive to said scanning means intercepting said character for subsequently operating said second actuating means and rendering said first actuating means inoperative; and means responsive to said scanning means not intercepting said character for subsequently operating said first actuating means and rendering said second actuating means inoperative.

2. The apparatus of claim 1 wherein said first actuating means includes generator means providing pulses at said high rate; and wherein said second actuating means includes pulse counter means responsive to said generator means for providing pulses at said low rate.

3. The apparatus of claim 1 wherein said line of text is stationary and wherein said scanning means includes cathode ray tube means positioned proximate to said line of text for projecting a beam spot thereon.

4. The apparatus of claim 1 including means for counting the number of times said scanning means is moved by said second actuatable means in response to the operation of said second actuating means; and means responsive to a predetermined number of times for subsequently operating said first actuating means and rendering said second actuating means inoperative.

5. The apparatus of claim 1 including means responsive to said scanning means intercepting said character for providing a signal train unique to that character;

a delay line;

means applying said signal train to said delay line;

a different set of taps connected to said delay line for each character capable of being recognized by said apparatus; and a summing means connected to each set of taps.

References Cited by the Examiner

UNITED STATES PATENTS

| | | | |
|---|---|---|---|
| 2,787,416 | 4/1957 | Hansen | 235—61 |
| 3,065,457 | 11/1962 | Bailey et al. | 340—146.3 |

FOREIGN PATENTS

| | | |
|---|---|---|
| 1,088,745 | 9/1960 | Germany. |

MAYNARD R. WILBUR, *Primary Examiner.*

MALCOLM A. MORRISON, *Examiner.*

J. S. IANDIORIO, J. E. SMITH, *Assistant Examiners.*